(12) United States Patent
Young

(10) Patent No.: US 6,706,969 B1
(45) Date of Patent: Mar. 16, 2004

(54) CABLE SUPPORTING AND SPACING DEVICE

(76) Inventor: Ken Young, 717 Gower Point Road, Gibsons, British Columbia (CA), V0N 1V8

( * ) Notice: Subject to any disclaimer, the term of this patent is extended or adjusted under 35 U.S.C. 154(b) by 0 days.

(21) Appl. No.: 10/401,553

(22) Filed: Mar. 31, 2003

(51) Int. Cl.[7] .............................. H02G 3/00; F16L 3/22
(52) U.S. Cl. ................. 174/95; 174/99 R; 248/68.1
(58) Field of Search .......................... 174/96, 95, 97, 174/98, 99 R, 100, 101, 138 G, 166 S; 248/68.1, 71, 73, 74.4

(56) References Cited

U.S. PATENT DOCUMENTS

| | | | | |
|---|---|---|---|---|
| 287,509 A | * | 10/1883 | Du Bois ................... | 174/99 R |
| 447,896 A | * | 3/1891 | Nash .......................... | 174/96 |
| 514,827 A | * | 2/1894 | Hampton ................. | 174/99 R |
| 3,968,323 A | * | 7/1976 | Blanchet ................... | 174/135 |
| 4,376,230 A | | 3/1983 | Bargsten | |
| 4,643,379 A | * | 2/1987 | Potocnik ...................... | 248/49 |
| 4,865,280 A | * | 9/1989 | Wollar ...................... | 248/68.1 |
| 4,892,275 A | * | 1/1990 | Szegda ........................ | 248/61 |
| 5,992,802 A | * | 11/1999 | Campbell ................. | 248/68.1 |
| 6,241,198 B1 | * | 6/2001 | Maruyama ................. | 248/49 |
| 6,378,811 B1 | * | 4/2002 | Potter et al. ............... | 248/68.1 |
| 6,402,096 B1 | * | 6/2002 | Ismert et al. .............. | 248/68.1 |
| 6,528,728 B1 | * | 3/2003 | Shima ........................ | 174/101 |

FOREIGN PATENT DOCUMENTS

WO    WO 96/08063    3/1996

\* cited by examiner

Primary Examiner—Dean A. Reichard
Assistant Examiner—Adolfo Nino
(74) Attorney, Agent, or Firm—Norman M. Cameron

(57) ABSTRACT

A cable support apparatus includes a plurality of cable spacing members. Each member has a plurality of spaced-apart cable receiving openings for receiving a plurality of cables in spaced-apart relationship. There is a bracket having a plurality of cable spacing member openings, each of the cable spacing member openings being shaped to releasably receive one of the cable spacing members, whereby each of the cable spacing members can be removed from or replaced on the bracket without removing any other said cable spacing member.

1 Claim, 2 Drawing Sheets

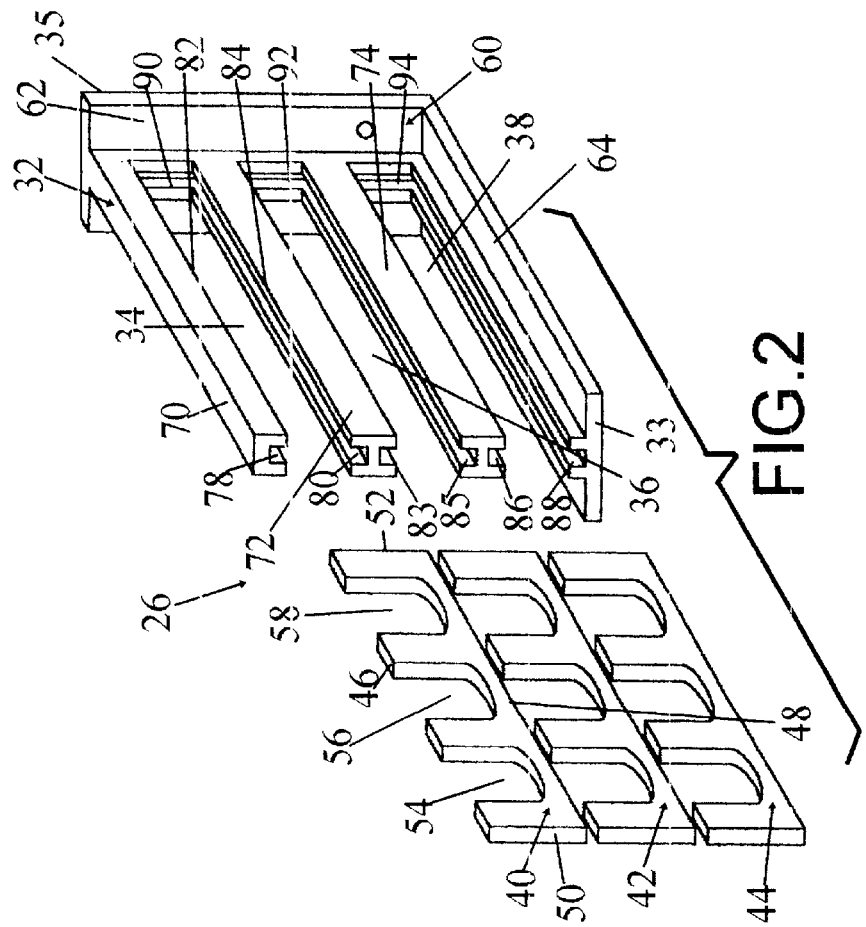
FIG.2
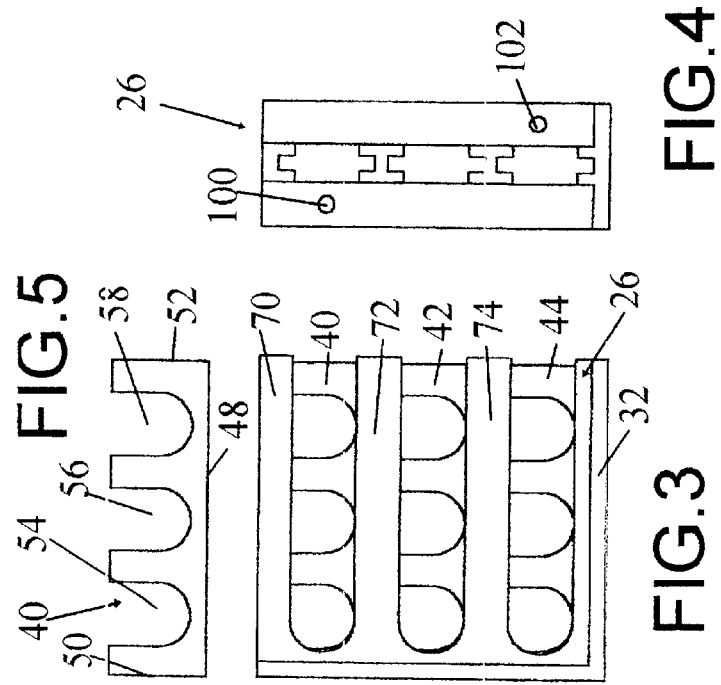
FIG.4
FIG.5
FIG.3

CABLE SUPPORTING AND SPACING DEVICE

BACKGROUND OF THE INVENTION

This invention relates to devices for supporting and spacing cables, particularly for spacing and supporting cables of wiring harnesses adjacent to panel boxes.

It is desirable to keep spaces between electrical cables in buildings, particularly where numerous cables extend adjacent to each other, such as near panel boxes. Properly spacing the cables keeps heat from building up. This heat could cause insulation on the cables to melt.

Various devices have been developed in the past to try and keep cables running in an orderly, spaced-apart manner. For example, U.S. Pat. No. 4,376,230 to Bargsten discloses a cable duct where cables, are supported in a spaced-apart relationship. However the structure does not allow for easy removal or replacement of some cables without disturbing cables in adjacent rows of cables.

Another such device is disclosed in International Patent Application No. PCT/DK 95/00360 which shows a mounting tray system for cables and the like. The cables are held in spaced-apart relationship within U-shaped depressions of a series of horizontal beams. However the beams are stacked in U-shaped frame wires in a manner such that lower rows of cables cannot be removed without disturbing cables in rows above.

Despite the prior art, accordingly, there still remains a need for a simple and inexpensive device for supporting and spacing cables, particularly near panel boxes, where cables can be arranged in spaced-apart positions in a plurality of rows and the innermost row can be removed without disturbing other rows of cables.

SUMMARY OF THE INVENTION

According to the invention, there is provided a cable support apparatus which includes a plurality of cable spacing members. Each member has a plurality of spaced-apart cable receiving openings for receiving a plurality of cables in spaced-apart relationship. There is a bracket having a plurality of cable spacing member openings, each of the cable spacing member openings being shaped to releasably receive one of the cable spacing members, whereby each of the cable spacing members can be removed from or replaced on the bracket without removing any other said cable spacing member.

Preferably the cable spacing members are elongated members and the cable spacing member openings are slots in the bracket for slidably receiving the cable spacing members.

Each of the cable receiving openings in each of the cable spacing members may be open ended to permit a cable to be positioned in the cable receiving opening or removed from the cable receiving opening. In one example, the cable receiving openings are U-shaped.

The invention offers significant advantages compared to earlier cable spacing devices. It allows cables in one layer to be removed without disturbing cables in other layers. Also devices according to the invention are simple and rugged in construction and relatively inexpensive to manufacture and sell. They are also useful for other types of cables besides electrical cables, such as computer network cables and audio cables.

BRIEF DESCRIPTION OF THE DRAWINGS

In drawings which illustrate embodiments of the invention:

FIG. 2 is an exploded view of a cable supporting apparatus according to an embodiment of the invention FIG. 3 is an assembled, front view thereof;

FIG. 4 is an end view of the bracket thereof; and

FIG. 5 is a front view of one of the cable spacing members of thereof.

DETAILED DESCRIPTION OF THE PREFERRED EMBODIMENTS

Figure 1:
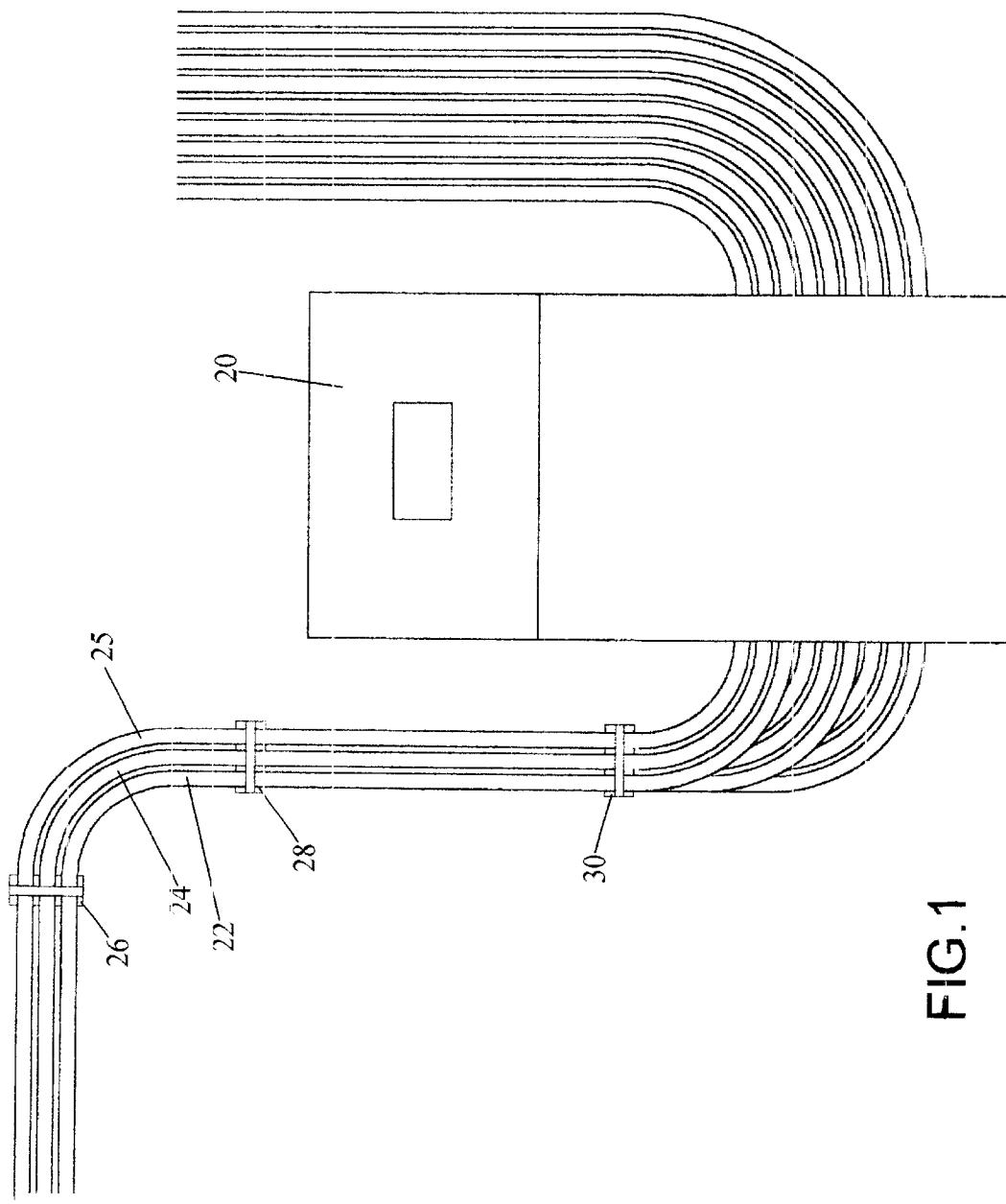
FIG. 1 is a front elevational view of a panel box with a plurality of cables connected thereto, the cables on one side thereof being supported by three cable supporting apparatuses according to embodiments of the invention.

Referring to the drawings, and first FIG. 1, this shows a conventional panel box 20, typically mounted on the wall of a building and which receives a plurality of cables 22, 24 and 25 which extend to various electrical fixtures in the building such as wall outlets, light fixtures and junction boxes. The cables are supported in a spaced-apart relationship by a plurality of cable support apparatuses 26, 28 and 30. These are all identical and details of one of these, apparatus 26, are shown in FIGS. 2–5.

Referring to FIG. 2, the cable support apparatus 26 includes a bracket 32 with a plurality of cable spacing member openings, in this case three slots 34, 36 and 38. Each of the slots receives one of three cable spacing members 40, 42 and 44, which are identical in this example. It should be understood that in other embodiments there could be more or fewer cable spacing members. The slots all open outwardly along side 33 of the bracket which is opposite side 35.

Each of the cable spacing members is an elongated, rectangular member, in this particular example, having a first edge 46, a second edge 48, a first end 50, and a second end 52, as shown for member 40. The edges 46 and 48 are parallel in this example. Each of the members has a plurality of cable receiving openings 54, 56 and 58, again shown for member 40, which are U-shaped recesses in this example and which are open ended along side 46. It should be understood that in other embodiments there could be different numbers of openings and the openings could be shaped differently.

The bracket 32 includes an L-shaped portion 60 adjacent to side 35 of the bracket, having two perpendicular parts 62 and 64 which form one side and the bottom of the bracket from the point of view of FIG. 2, although it should be understood that the bracket could be oriented differently. A plurality of elongated members 70, 72, and 74 extend outwardly in spaced-apart relationship from part 62 of the L-shaped portion 60. Channel-shaped guide tracks 78 and 80 are formed along opposing sides 82 and 84 of members 70 and 72. These are sized and positioned to slidably receive cable spacing member 40 as shown in FIG. 3. Likewise members 72 and 74 have guide tracks 83 and 85 for slidably receiving cable spacing member 42. Finally guide tracks 86 and 88 along member 74 and part 64 of L-shaped portion 60 slidably receive member 44.

Channels 90, 92 and 94 extend between the respective pairs of guide tracks along part 62 of L-shaped portion 60 and receive the ends 52 of the cable spacing members when the cable spacing members are fully inserted into the openings 34, 36 and 38 as shown in FIG. 3. In one example of the invention there is a small projection on each of the members 40, 42 and 44 which engages a small dimple on the guide tracks when the members are fully inserted to latch the members in place. Other latching mechanisms could be used alternatively.

The bracket has means for mounting the bracket on a surface, such as wall, comprising a pair of apertures 100 and 102 which can receive suitable fasteners such as nails or screws. Alternative means could be used for mounting the bracket including adhesives.

In use, the bracket typically would first be mounted on a surface such as a wall using, for example, screws inserted through apertures 100 and 102. The cables 22, 24 and 25 are then positioned, for example, in the openings 54, 56 and 58 of cable receiving member 40. The cable receiving member 40 is then inserted into the opening 34 of the bracket along guide tracks 78 and 80. Similar cables are then positioned in the corresponding openings of the members 42 and 44 and they are then inserted into the corresponding positions on the bracket. It may be seen that the cables therefore are supported in a spaced-apart relationship by the apparatus.

Moreover, is not necessary to disturb the cables extending through members 40 and 42 in order to remove the cables extending through member 44. This is possible because the members 40, 42 and 44 can be independently removed from the bracket without disturbing the other such members. This is unlike the prior art where the cable receiving members were typically stacked in such a way that a bottommost member could not be removed without disturbing other members and cables stacked on top of it. Furthermore, in order to access one cable it is merely necessary to slide out the member 40, 42 or 44 holding the cable and it is not necessary to remove other cables from this member. Thus, for the illustrated embodiment, all nine cables can be accessed without significant alteration of adjacent cables.

It will be understood by someone skilled in the art that many of the details provided above are by way of example only and are not intended to limit the scope of the invention which is to be interpreted with reference to the following claims.

What is claimed is:

1. A cable support apparatus comprising:

a plurality of cable spacing members, each of said members having a plurality of spaced-apart cable receiving openings for receiving a plurality of cables in spaced-apart relationship, the cable spacing members being elongated members, each of the cable receiving openings in each of the cable spacing members being open-ended to permit a cable to be positioned in said each cable receiving opening or removed from said each cable receiving opening; and a bracket having a plurality of cable spacing member openings, each of the cable spacing member openings being shaped to releasably receive one of the cable spacing members, the cable spacing member openings being slots in the bracket for slidably receiving the cable spacing members, whereby each of the cable spacing members can be removed from or replaced on the bracket without removing any other of said cable spacing members, the bracket having parallel, spaced-apart guide tracks on opposite sides of each said slot for slidably and separately receiving one of the cable spacing members.

* * * * *